(12) United States Patent
Turner et al.

(10) Patent No.: US 12,154,136 B2
(45) Date of Patent: *Nov. 26, 2024

(54) UTILIZING A SECONDARY APPLICATION TO RENDER INVITATIONAL CONTENT

(71) Applicant: Apple Inc., Cupertino, CA (US)

(72) Inventors: William Bedford Turner, Campbell, CA (US); Thomas Alsina, Mountain View, CA (US); Sean B. Kelly, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 587 days.

This patent is subject to a terminal disclaimer.

(21) Appl. No.: 15/467,639

(22) Filed: Mar. 23, 2017

(65) Prior Publication Data

US 2017/0200200 A1     Jul. 13, 2017

Related U.S. Application Data (63) Continuation of application No. 15/383,882, filed on Dec. 19, 2016, which is a continuation of application
(Continued)

(51) Int. Cl.
*G06Q 30/00* (2023.01)
*G06F 3/0482* (2013.01)
(Continued)

(52) U.S. Cl.
CPC ....... *G06Q 30/0267* (2013.01); *G06F 3/0482* (2013.01); *G06F 3/0485* (2013.01);
(Continued)

(58) Field of Classification Search
CPC ............... G06Q 30/0267; G06Q 10/00; G06Q 30/0201; G06Q 30/0277; G06F 9/451;
(Continued)

(56) References Cited

U.S. PATENT DOCUMENTS 6,011,537 A  *  1/2000  Slotznick ................. G06F 3/14
                                                            715/733
6,185,625 B1      2/2001  Tso
(Continued)

FOREIGN PATENT DOCUMENTS

EP        2109077 A2    10/2009
EP        2309441 A1    4/2011

OTHER PUBLICATIONS

International Preliminary Report on Patentability from PCT Application No. PCT/US2013/041200 dated Nov. 27, 2014.

*Primary Examiner* — Adam M Queler
*Assistant Examiner* — David Faber
(74) *Attorney, Agent, or Firm* — Polsinelli PC (57) ABSTRACT

Disclosed herein are systems, methods, and non-transitory computer-readable storage media for utilizing a secondary application to render invitational content. Primary content rendered by a web browser can be embedded with a command requesting that a secondary application be executed. The secondary application can be executed in a secured sand box environment and configured to render invitational content in a second window above the primary content. The secondary application can be known and trusted by the operating system to gather sensitive data used to select appropriate invitational content. Further, data can be included in the command requesting that the secondary application be executed. The invitational content can be associated with secondary views that can be rendered without affecting the primary content. The secondary application can collect data to render the secondary view, such as the exact point selected, which is used to render graphical transition effects leading to the secondary view.

26 Claims, 7 Drawing Sheets

Related U.S. Application Data

No. 13/472,425, filed on May 15, 2012, now Pat. No. 9,524,477.

(51) Int. Cl.

| | | |
|---|---|---|
| *G06F 3/0485* | (2022.01) | |
| *G06F 9/451* | (2018.01) | |
| *G06F 16/93* | (2019.01) | |
| *G06F 16/95* | (2019.01) | |
| *G06F 16/951* | (2019.01) | |
| *G06F 16/958* | (2019.01) | |
| *G06F 40/143* | (2020.01) | |
| *G06Q 10/00* | (2023.01) | |
| *G06Q 30/0201* | (2023.01) | |
| *G06Q 30/0241* | (2023.01) | |
| *G06Q 30/0251* | (2023.01) | |

(52) U.S. Cl.
CPC .............. *G06F 9/451* (2018.02); *G06F 16/93* (2019.01); *G06F 16/95* (2019.01); *G06F 16/951* (2019.01); *G06F 16/958* (2019.01); *G06F 40/143* (2020.01); *G06Q 10/00* (2013.01); *G06Q 30/0201* (2013.01); *G06Q 30/0277* (2013.01); *G06F 2216/03* (2013.01)

(58) Field of Classification Search
CPC ............... G06F 3/0485; G06F 17/2247; G06F 17/30011; G06F 17/30861; G06F 17/30864; G06F 17/3089
USPC ......................................................... 715/760
See application file for complete search history.

(56) References Cited

U.S. PATENT DOCUMENTS

| | | | | |
|---|---|---|---|---|
| 6,327,574 B1* | 12/2001 | Kramer | ............ | G06F 17/30893 |
| | | | | 705/14.66 |
| 6,330,670 B1 | 12/2001 | England et al. | | |
| 7,346,649 B1 | 3/2008 | Wong | | |
| 7,430,712 B2 | 9/2008 | Arokiaswamy | | |
| 8,005,717 B2 | 8/2011 | Joo | | |
| 8,103,743 B2 | 1/2012 | Tokumi | | |
| 8,166,167 B2 | 4/2012 | Prasad et al. | | |
| 8,812,959 B2 | 8/2014 | Bousseton et al. | | |
| 9,032,066 B1* | 5/2015 | Erdmann | ................ | G06F 21/53 |
| | | | | 709/224 |
| 9,183,566 B2 | 11/2015 | Mhatre et al. | | |
| 2004/0167928 A1* | 8/2004 | Anderson | ............. | G06Q 30/02 |
| 2004/0260767 A1 | 12/2004 | Kedem | | |
| 2006/0031419 A1 | 2/2006 | Huat | | |
| 2006/0242584 A1 | 10/2006 | Johanson | | |
| 2007/0101289 A1* | 5/2007 | Awada | .................. | G06F 3/0481 |
| | | | | 715/784 |
| 2007/0220428 A1* | 9/2007 | Kureshy | ................. | G06F 9/451 |
| | | | | 715/708 |
| 2007/0266342 A1 | 11/2007 | Chang et al. | | |
| 2008/0046595 A1 | 2/2008 | Prasad et al. | | |
| 2008/0155576 A1* | 6/2008 | Horvitz | ................... | G06F 9/451 |
| | | | | 719/328 |
| 2009/0144124 A1 | 6/2009 | Surendran | | |
| 2009/0187928 A1* | 7/2009 | Mark | ..................... | G06Q 30/02 |
| | | | | 719/329 |
| 2009/0254861 A1* | 10/2009 | Seetharamakrishnan | .................... | |
| | | | | G11B 27/34 |
| | | | | 715/810 |
| 2009/0288012 A1 | 11/2009 | Hertel et al. | | |
| 2009/0313116 A1* | 12/2009 | Ashbaugh | ............ | G06F 17/211 |
| | | | | 705/14.47 |
| 2010/0153836 A1 | 6/2010 | Krassner | | |
| 2010/0199318 A1 | 8/2010 | Chang et al. | | |
| 2011/0030008 A1* | 2/2011 | Kang | ................. | H04N 5/44543 |
| | | | | 725/43 |
| 2011/0125594 A1* | 5/2011 | Brown | ............... | G06Q 30/0241 |
| | | | | 705/14.73 |
| 2011/0161990 A1* | 6/2011 | Smith | ..................... | G06F 21/00 |
| | | | | 719/328 |
| 2011/0173071 A1 | 7/2011 | Meyer | | |
| 2011/0246296 A1* | 10/2011 | Howard | ................. | G06Q 30/02 |
| | | | | 705/14.53 |
| 2011/0320529 A1* | 12/2011 | Mentchoukov | ........ | G06F 40/106 |
| | | | | 709/203 |
| 2012/0089481 A1 | 4/2012 | Iozzia et al. | | |
| 2012/0158511 A1* | 6/2012 | Lucero | ............... | H04N 21/6543 |
| | | | | 705/14.64 |
| 2012/0173343 A1 | 7/2012 | Koning et al. | | |
| 2012/0204109 A1 | 8/2012 | Julia et al. | | |
| 2012/0246017 A1* | 9/2012 | Kleber | ................... | G06Q 30/02 |
| | | | | 705/14.73 |
| 2013/0139182 A1* | 5/2013 | Sethuraman | ........... | G06Q 50/01 |
| | | | | 719/320 |

* cited by examiner

UTILIZING A SECONDARY APPLICATION TO RENDER INVITATIONAL CONTENT

CROSS REFERENCE TO RELATED APPLICATIONS

This application is a continuation of, and claims the benefit of priority to, U.S. application Ser. No. 15/383,882, filed on Dec. 19, 2016 which in turn is a continuation of U.S. application Ser. No. 13/472,425, filed on May 15, 2012, which is expressly incorporated by reference herein in its entirety.

BACKGROUND

1. Technical Field

The present disclosure relates to invitational content and more specifically to rendering invitational content with a secondary application.

2. Introduction

Mobile devices have unlocked great potential for advertisers to see greater return on their investment. Mobile devices are such an important part of a user's life that they can collect very detailed information about the user that can in turn be used by an advertising server to effectively target advertisements to users that will be interested in those advertisements.

While targeting advertisements that are of interest to a user ultimately provides a benefit to both the user and the advertiser, the information potentially collected by a mobile device and shared and utilized by an adverting server can be highly sensitive. Accordingly, if a mobile device operating system is going to have access to such sensitive data, or collect such sensitive data it must do so in accordance with a published privacy policy.

Due to the sensitive nature of the information involved there is a continuing need to develop mechanisms to protect a user's private information, while still effectively targeting advertisements to the user.

A further problem with advertising on mobile devices is that given the small interfaces of these devices, the user interfaces of these devices must be highly refined to provide a good user experience. Unlike advertisements presented on more conventional computers with larger workspaces, user interfaces, and input devices which can afford to navigate a user away from a viewed web page or open a pop-up window, such actions cannot be tolerated in the mobile environment due to the resulting inconvenience to the user to have to navigate back to the originally viewed content after they are done interacting with the advertisement. Accordingly there is a need for a refined user interface and user experience for displaying advertisements within web pages on a mobile device.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, devices, methods, and non-transitory computer-readable storage media for utilizing a secondary application to render invitational content. A web browser application can request primary content, such as a webpage, from a primary content provider. The requested primary content can be delivered as code that can be rendered by the web browser application to display the webpage in a first window. The primary content can also include code requesting that a secondary application be executed within the web browser application. For example, the secondary application can be configured to render invitational content in a second window, view or layer above the primary content in the web browser. In some embodiments, the code to execute the secondary application can be an object tag associated with a special non-standard MIME type. Upon rendering such code, the web browser can send a command to the operating system to execute the secondary application. The secondary application can be an application known and trusted by the operating system and thus configured to communicate with the operating system to request and receive sensitive information. To maintain the security of the sensitive information, the operating system can execute the secondary application in a secured sand box environment, thus protecting the information from other untrusted and less secure applications, such as the web browser.

The secondary application can be configured to request invitational content from an invitational content provider or content delivery system, and render the received invitational content in a second window over the primary content. The primary content and the invitational content are thus rendered in two separate windows and by two separate threads while visually appearing to be rendered as one.

The secondary application can send data to the invitational content provider or content delivery system used to select appropriate invitational content. In some embodiments the data can be included as part of the command requesting that the secondary application be executed. In some embodiments, the secondary application can harvest the data. For example, because the secondary application is a trusted application, the secondary application can communicate with the operating system to harvest sensitive data regarding the user and the user terminal. Further, the sand boxed secondary application protects the sensitive data from other less secure applications, only sharing it with a trusted invitational content provider or content delivery system.

The secondary application can be configured to render the invitational content above an allocated space in the primary content so that the invitational content does not interfere with the primary content. In some embodiments, the invitational content can be associated with secondary views, different than the initial view. For example, invitational content such as a banner ad can be configured to navigate a user to further information concerning the advertised product upon selection by the user. Because the invitational content is rendered in a second application, secondary views can be rendered without affecting the primary content rendered in the web browser application below. Further, the secondary application can be configured to collect data used to properly render the secondary view. For example, the secondary application can gather data at the moment the invitational content is selected, such as the exact point the user selected, which can be used to render graphical transition effects leading to the secondary view.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
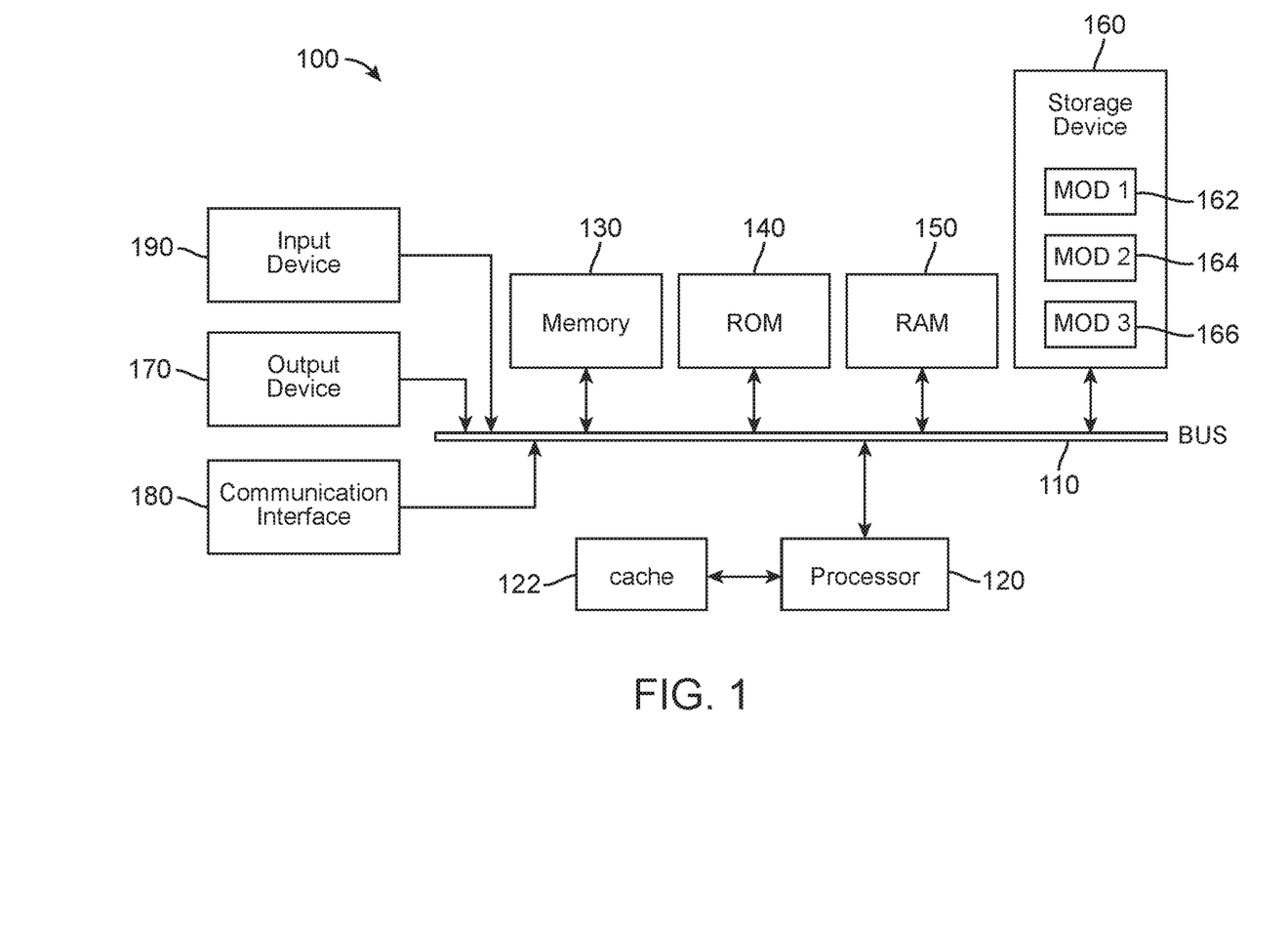
FIG. 1 illustrates an example system embodiment.

FIG. 1 illustrates an exemplary system 100 that includes a general-purpose computing device 100, including a processing unit (CPU or processor) 120 and a system bus 110 that couples various system components including the system memory 130, such as read only memory (ROM) 140, and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166, which are modules configured to control the processor 120. These modules may be stored on the storage device 160 and loaded into RAM 150 or memory 130 at runtime or may be stored as would be known in the art in other computer-readable memory locations.

Figure 2:
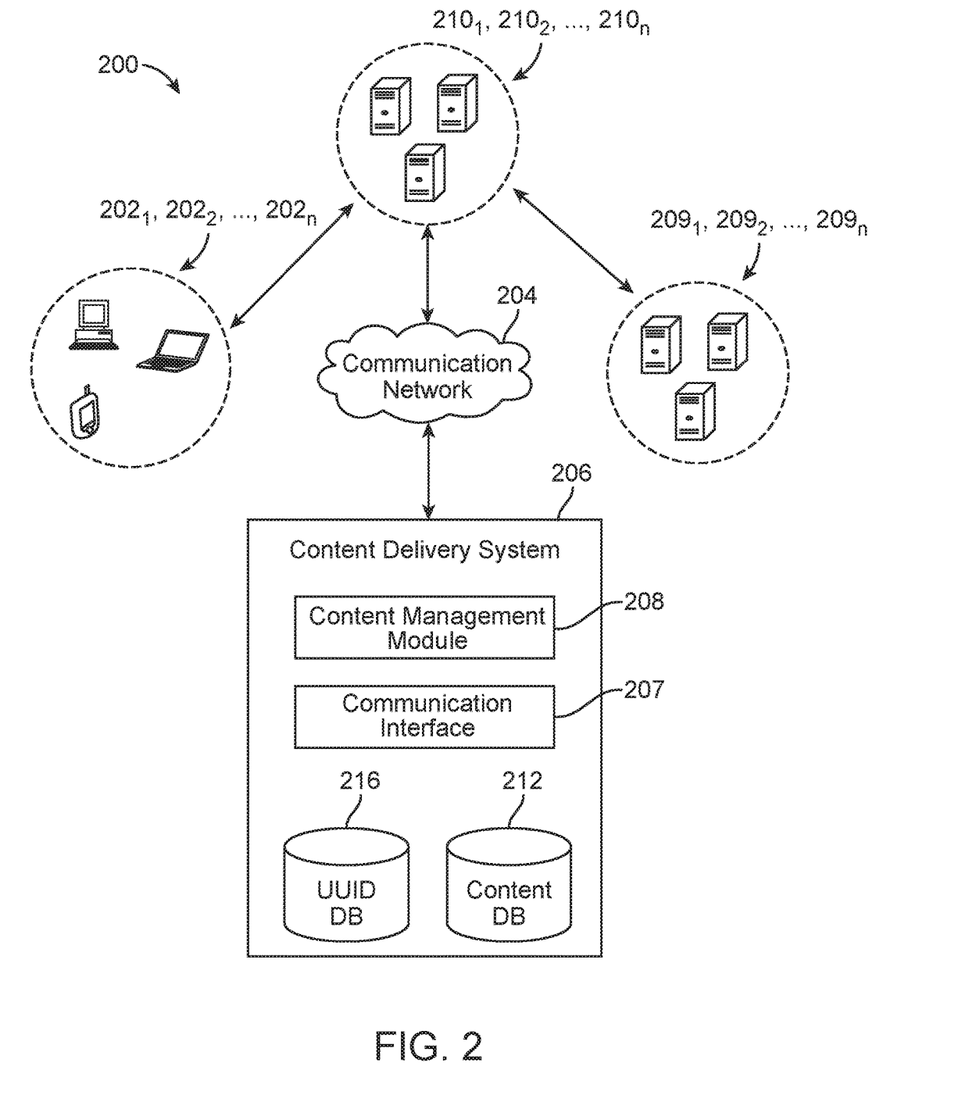
FIG. 2 illustrates which an exemplary system configuration, wherein electronic devices communicate via a network for purposes of exchanging content and other data.

Having disclosed some components of a computing system, the disclosure now turns to FIG. 2, which illustrates an exemplary system configuration 200, wherein electronic devices communicate via a network for purposes of exchanging content and other data. The system can be configured for use on a network as that illustrated in FIG. 2. However, the present principles are applicable to a wide variety of network configurations that facilitate the intercommunication of electronic devices. For example, each of the components of system 200 in FIG. 2 can be implemented in a localized or distributed fashion in a network.

In system 200, invitational content is delivered to user terminals $202_1 \ldots 202_n$ (collectively "202") connected to a communication network 204 by direct and/or indirect communications with a content delivery system 206. In particular, the content delivery system 206 receives a request for a content package of electronic-invitational content, such as a web page, an application, a game, or media, etc., from one of user terminals 202. In the various embodiments, one or more types of invitational content can be combined in a content package. The user terminal 202 can be configured to render the received invitational content. This can include display or playing the invitational content appropriately depending on the form of the invitational content. For example, the invitational content can include text, graphics, audio, video, executable code or any combination thereof.

Upon successfully rendering the delivered invitational content, the user terminal 202 can be configured to send a notification to the content delivery system 206. In some embodiments the notification can be a web beacon such as an embedded tracking pixel. In some embodiments the operating system of the user terminal 202 is configured to report rendering of the invitational content. In some embodiments, the notification can be cryptographically secured by means such as authentication and digests.

In some embodiments, the invitational content can be associated with a product or can directly or indirectly advertise a product. In some embodiments, the content package can be configured to replace or update invitational content in a content package already delivered to the user terminal.

Further, the invitational content can be active invitational content. That is, invitational content that is designed to primarily elicit a pre-defined response from the user. For example, active invitational content can include one or more types of advertisements configured to be clicked upon, solicit information, or be converted by the user into a further action, such as a purchase or download of the advertised item. In some embodiments, active invitational content can include secondary views that can be presented to a user upon selection of an initial view of the invitational content. For example, the initial view can be a banner advertisement that, when selected, directs the user to a secondary view such as a multimedia advertisement.

However, invitational content can also include passive invitational content. That is, invitational content that is designed to primarily inform the user. In some cases, passive invitational content can include information that can lead or direct users to active invitational content. Additionally, the invitational content can be dynamic invitational content. That is, invitational content that varies over time or that varies based on user interaction with the invitational content. However, the various embodiments are not limited in this regard and the invitational content can be static invitational content that does not vary over time or that varies based on user interaction. In the various embodiments, an invitational content in a content package can be static or dynamic and active or passive. Further, various types of invitational content can be combined in a same content package.

After receiving the request for invitational content, the content delivery system 206 selects the invitational content in response to the request and transmits the assembled invitational content to the requesting one of user terminals 202. In some embodiments, the server has preselected the invitational content before the request is received. Thereafter, the server assembles a content package of invitational content and causes the content package to be delivered to the user. The content delivery system can include a communications interface 207 to facilitate communications with the user terminals 202 and any other components familiar to those of ordinary skill in the art.

The content delivery system 206 includes a content management module 208 that facilitates generation of the assembled content package, which can include invitational content. Specifically, the content management module can combine content from one or more primary content providers $209_1 \ldots 209_n$ (collectively "209") and content from one or more invitational content providers $210_1 \ldots 210_n$ (collectively "210") to generate the assembled content package for the user terminals 202. For example, in the case of a web page being delivered to a requesting one of user terminals 202, the content management module 208 can assemble a content package by requesting the data for the web page from one of the primary content providers 209 maintaining the web page. For the invitational content on the web page provided by the invitational content providers 210, the content management module 208 can request the appropriate data according to the arrangement between the primary and invitational content providers 209 and 210. In some embodiments, device 202 can directly request or already have access to primary content from primary content provider 209. In such embodiments, device 202 can further request invitational content from system 206. System 206 can identify and deliver invitational content appropriate for association with primary content. For example, primary content such as an application can already reside or be running of a device 202, and primary content can direct device 202 to request invitational content from system 206 to be associated with primary content on device 202.

Although primary and invitational content providers 209 and 210 are presented herein as separate entities, this is for illustrative purposes only. In some cases, the primary and invitational content providers 209 and 210 can be the same entity. Thus, a single entity can define and provide both the primary and the invitational content.

Although the content management module 208 can be configured to request that content be sent directly from content providers 209 and 210, a cached arrangement can also be used to improve performance of the content delivery system 206 and improve overall user experience. That is, the content delivery system 206 can include a content database 212 for locally storing/caching content maintained by content providers 209 and 210. The data in the content database 212 can be refreshed or updated on a regular basis to ensure that the content in the database 212 is up-to-date at the time of a request from a user terminal. However, in some cases, the content management module 208 can be configured to retrieve content directly from content providers 209 and 210 if the metadata associated with the data in content database 212 appears to be outdated or corrupted.

In some embodiments, the primary and invitational content can be assembled by the user terminal 202. For example, the primary content and invitational content can be delivered to the user terminal 202 and assembled at the user terminal 202 based on assembly rules dictating how to properly assemble the primary and invitational content together. In some embodiments, the assembly rules can be delivered to the user terminal 202 by the content delivery system 206.

In the various embodiments, the content delivery system 206 can also include a unique user identifier (UUID) database 216 that can be used for managing sessions with the various user terminal devices 202. The UUID database 216 can be used with a variety of session management techniques. For example, the content delivery system 206 can implement an HTTP cookie or any other conventional session management method (e.g., IP address tracking, URL query strings, hidden form fields, window name tracking, authentication methods, and local shared objects) for user terminals 202 connected to content delivery system 206 via a substantially persistent network session. However, other methods can be used as well. For example, in the case of handheld communications devices, such as mobile phones, smart phones, tablets, or other types of user terminals connecting using multiple or non-persistent network sessions, multiple requests for content from such devices may be assigned to a same entry in the UUID database 216. The delivery system 206 can analyze the attributes of requesting devices to determine whether such requests can be attributed to the same user. Such attributes can include device or group-specific attributes.

Figure 3:
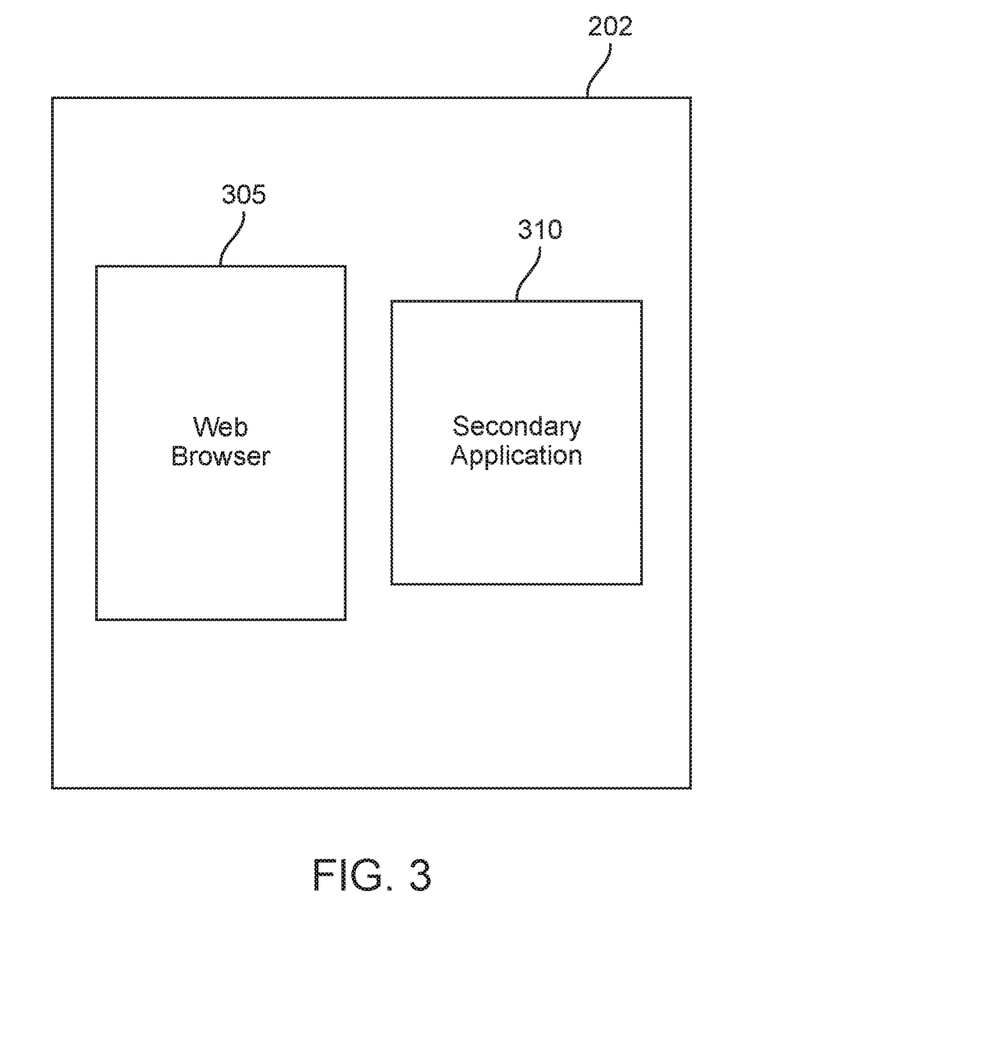
FIG. 3 illustrates an exemplary embodiment of a user terminal configured to request and render primary and invitational content.

FIG. 3 illustrates an exemplary embodiment of a user terminal 202 that includes a web browser application 305 configured to request and render primary content. A web browser 305 can be configured to allow a user to enter a uniform resource locator (URL) which references a specific internet resource. The web browser 305 can use the entered URL to request content from the appropriate content provider and render the received content on the user terminal. The received content can be in numerous forms such as Hyper Text Markup Language (HTML), JavaScript, Extensible Markup Language (XML), etc. The web browser 305 can be configured to process the received content and render it appropriately on the user terminal 202.

The web browser 305 can be configured to allow a secondary application 310 to access predetermined functionality of the web browser 305 so that the secondary application 310 can run seamlessly with the web browser. For example, the web browser can provide this functionality as an Application Programming Interface (API) that defines functions of the web browser 305 that can be used by the secondary application 310. The API allows a secondary application 310, such as a plug-in application, to be configured to execute with the web-browser and appear as one program although the two run separately. For example, in some embodiments, the secondary application 310 can be configured to request and render invitational content; the invitational content can be rendered by a separate thread than the primary content and in a separate window above the primary content, while appearing to be one rendered image. The term window is used as one example and is not meant to be limiting. One skilled in the art would recognize that the invitational content can be rendered in any number of ways such as in a separate hosted view or layer above the primary content.

To use the secondary application 310 to request and render invitational content, a primary content provider can include an object tag embedded within the primary content which, when processed by the web browser 305, sends a request to the operating system to execute the secondary application 310. In some embodiments the object tag can be associated with a special (non-standard) MIME type that is recognized by the web browser to request execution of the secondary application 310.

When executed, the secondary application 310 can be configured to request and retrieve invitational content from an invitational content server or content delivery system and render the content in a separate window above the primary content. The secondary application can be an application known and trusted by the operating system and thus given permission to communicate with the operating system to harvest sensitive data that should not be shared with third-party applications. An application can be deemed trusted by being certified by the developer of the operating system. For example, the developer of the secondary application can design the secondary application based on guidelines set by the developer of the operating system and the secondary application can be reviewed by the developer of the operating system to ensure that the guidelines have been met. In some embodiments, the developer of the operating system can also be the developer of the secondary application and thus have developed the secondary application according to their guidelines. Once certified, the secondary application can include a token that can be passed to the operating system to signify that it has been certified as a trusted application. In some embodiments, the operating system can reference a list of all applications certified as trusted.

The operating system can launch the secondary application 310 in a secure sand boxed environment that limits third party application access to the secondary application 310, and thus further protects the sensitive data shared with the secondary application 310. The secondary application 310 can be configured to only share the sensitive data with a trusted invitational content provider or content delivery system.

Figure 4:
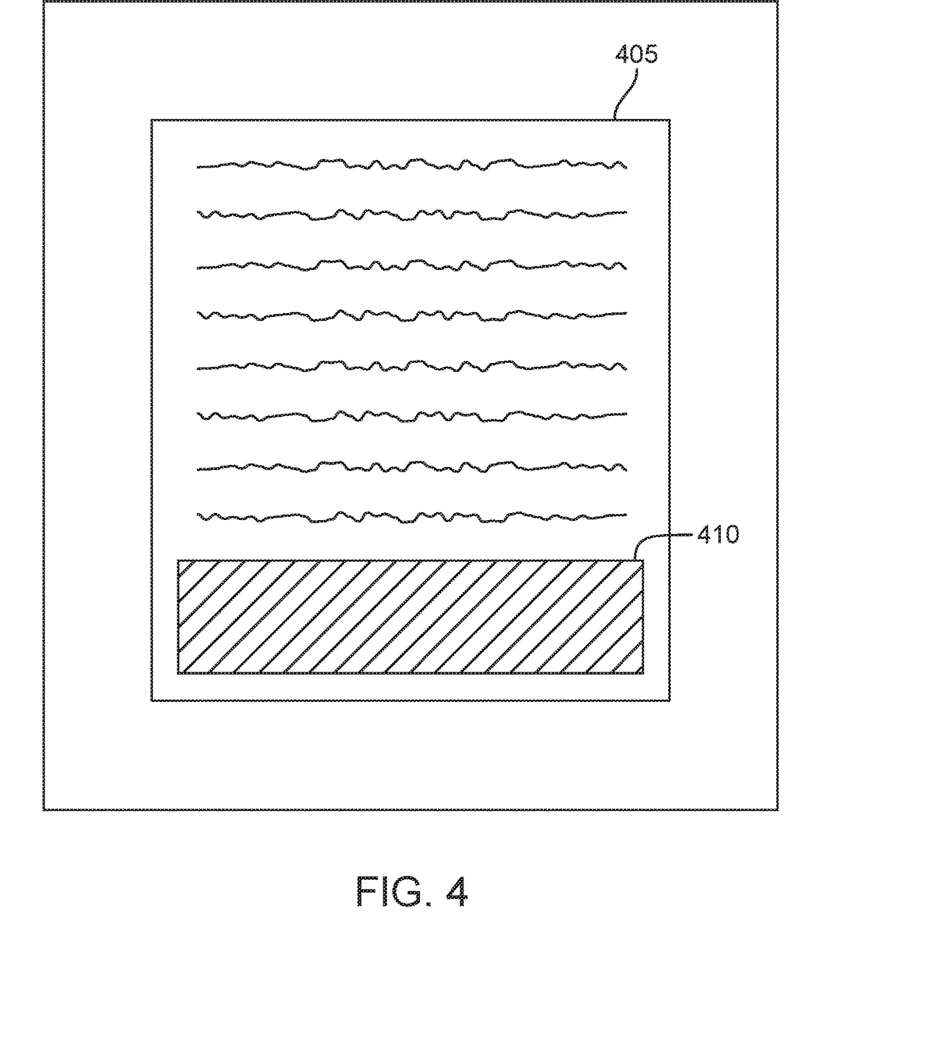
FIG. 4 illustrates an exemplary screenshot of primary content displayed by a web browser.

To ensure that the invitational content does not interfere with the primary content, the primary content can be configured to allocate a portion of the primary content to display the invitational content. The allocated portion can be left blank or include a default image or text. FIG. 4 illustrates an exemplary screenshot of primary content 405 displayed by a web browser. As illustrated, a portion of the screen 410 can be allocated to display the invitational content. A primary content provider can provide for this allocated space 410 in the code for the primary content and include an object tag which causes the operating system to create and instance of the secondary application to manage the display of invitational content over the allocated space 410. It is important to note that the invitational content is not actually rendered within the allocated space 410 in the same window, but rather in a second window placed above the allocated space 410 to create the illusion that the primary and invitational content are rendered as one page.

To further ensure that the invitational content does not interfere with the primary content, in some embodiments, the invitational content and allocated space can be one of a predefined set of standard sizes agreed upon by the primary and invitational content providers. To add more flexibility, in some embodiments, properties of the allocated space can be used by the secondary application to ensure that the invitational content is properly rendered within the allocated space. For example, properties of the allocated space can include the dimensions of the allocated space. These properties can be used by the secondary application to request appropriately sized invitational content from the invitational content provider or content delivery system. For example, the secondary application can include the dimensions of the allocated space in the request sent to the content delivery system. The content delivery system can then return appropriately sized invitational content based on the received dimensions. In some embodiments the secondary application can use the properties to scale the invitational content to fit within the allocated space.

In some embodiments, the properties can dictate that a specific type or variant of invitational content be selected. For example, the properties can dictate that the invitational content be limited to a certain form, such as only text or not containing video. This may be because of limitations of the user terminal or setting chosen by the user. Properties specifying the proper type can be used to select an appropriate item of invitational content. In some embodiments, an item of invitational content may be offered in various variants, such as a text only version or a video version, and the properties can thus be used to select the proper variant of the invitational content.

In some embodiments, the properties of the allocated space can be passed to the secondary application as part of the object tag which requests that the secondary application be executed. In some embodiments the secondary application can be configured to harvest data from the web browser to determine the properties. In some embodiments, the properties can be received as a combination of data passed by the object tag and data harvested by the secondary application.

In some embodiments, a primary content provider can configure the primary content to use the secondary application to replace existing embedded content. For example, invitational content embedded within primary content might not always be compatible or optimal to be performed with the user terminal or operating system. The primary content can be configured to check the user agent of the web browser to determine the type of user terminal and the operating system to make a determination on whether to render the embedded invitational content or request that a secondary application be executed to render invitational content replacing the embedded invitational content. The location of the embedded invitational content can then be used by the secondary application as an allocated space to render the replacement invitational content. For example, the dimensions and location of the embedded invitational can be passed to the secondary application by the web browser and used as properties to request and render the invitational content. The secondary application can then render the invitational in a second window over the area where the embedded invitational content would have been rendered, thus replacing it.

One advantage of utilizing a secondary application to render invitational content is that the primary content and the invitational content are not rendered by the same process or in the same window. This allows the invitational content to be configured to initiate secondary views without a user being navigated away from the primary content. When invitational content is embedded within the primary content and thus rendered by the web browser in the same window as the primary content, selection of the invitational content to bring up a secondary view requires changing both the primary and invitational content because the two are rendered as one process and in one window. By using a secondary application that renders the invitational content in a second window that is displayed over the primary content, secondary views of the invitational content can be rendered in the second window without affecting the window that the primary content is rendered in. Use of the secondary application thus results in the user being able to request and view additional invitational content while not navigating away from the primary content.

Figure 5A:
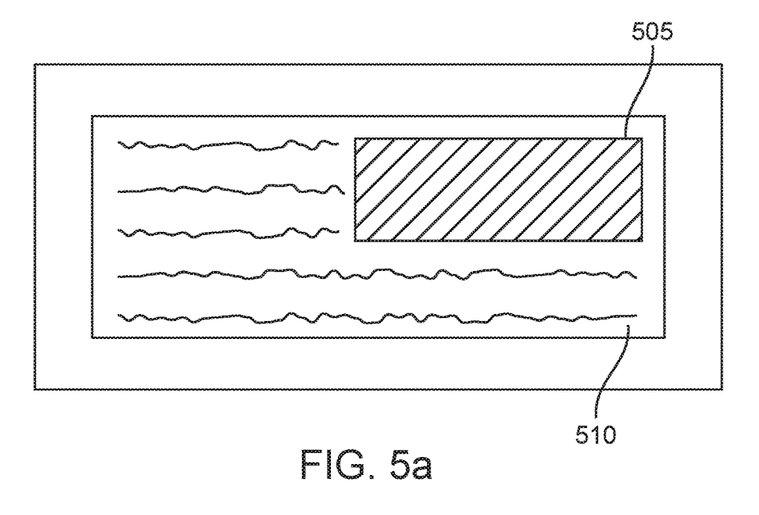
FIGS. 5a and 5b illustrate screenshots of invitational content rendered within a web browser by a secondary application.
Figure 5B:
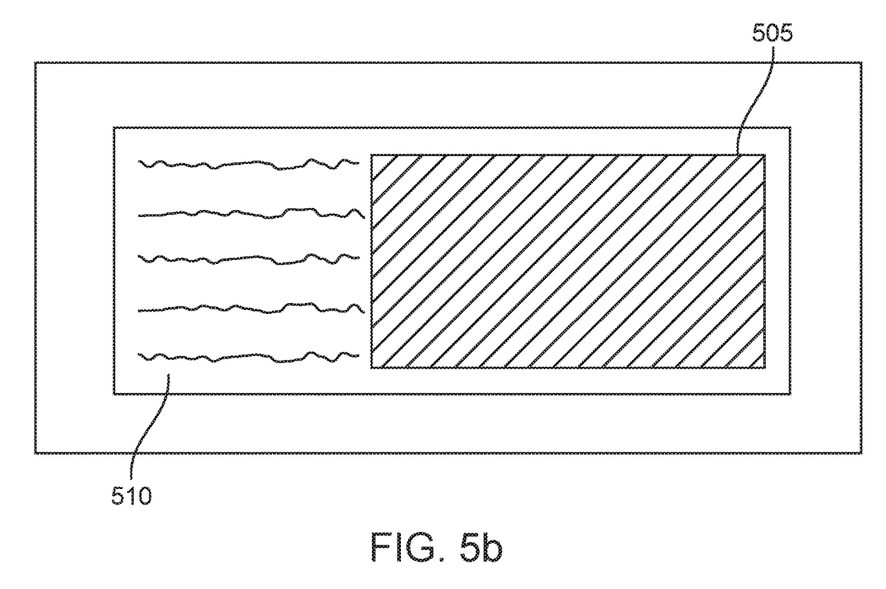

FIGS. 5a and 5b illustrate a screenshot of invitational content 505 rendered within a web browser by a secondary application. As illustrated, the invitational content 505 is rendered on top of the primary content 510 in an allocated space so that it does not interfere with the primary content rendered below. FIG. 5b illustrates an exemplary embodiment of a secondary view of the invitational content 505 being rendered over the primary content 510. As illustrated, upon selection, the invitational content 505 can be configured to expand and provide the user with a secondary view including further content while the primary content 510 remains unchanged.

While in this example the secondary view expands and requires a user's interaction to be initiated, this is only one possible embodiment. In some embodiments, the secondary view can be the same size or even smaller than the initial view. In some embodiments, user interaction is not required to initiate a secondary view of the invitational content. For example, the secondary application can be configured to rotate the invitational content that is rendered based on time, without any interaction by the user. Further, although the term secondary view is used, the number of secondary views is not limited to two. There can be any number of secondary views.

In some embodiments, the secondary application can be configured to render the invitational content in a dynamic view. For example, the invitational content can be rendered to allow a user to scroll through multiple items of invitational and then select the item they wish to view. In some embodiments, the secondary application can be configured to display a static cover view representing each item of invitational content and render multiple cover views, each representing a different item of invitational content, such that they can be scrolled through by the user. The user can thus learn what items of invitational content are available and select an item of invitational content which they wish to view.

Figure 6:
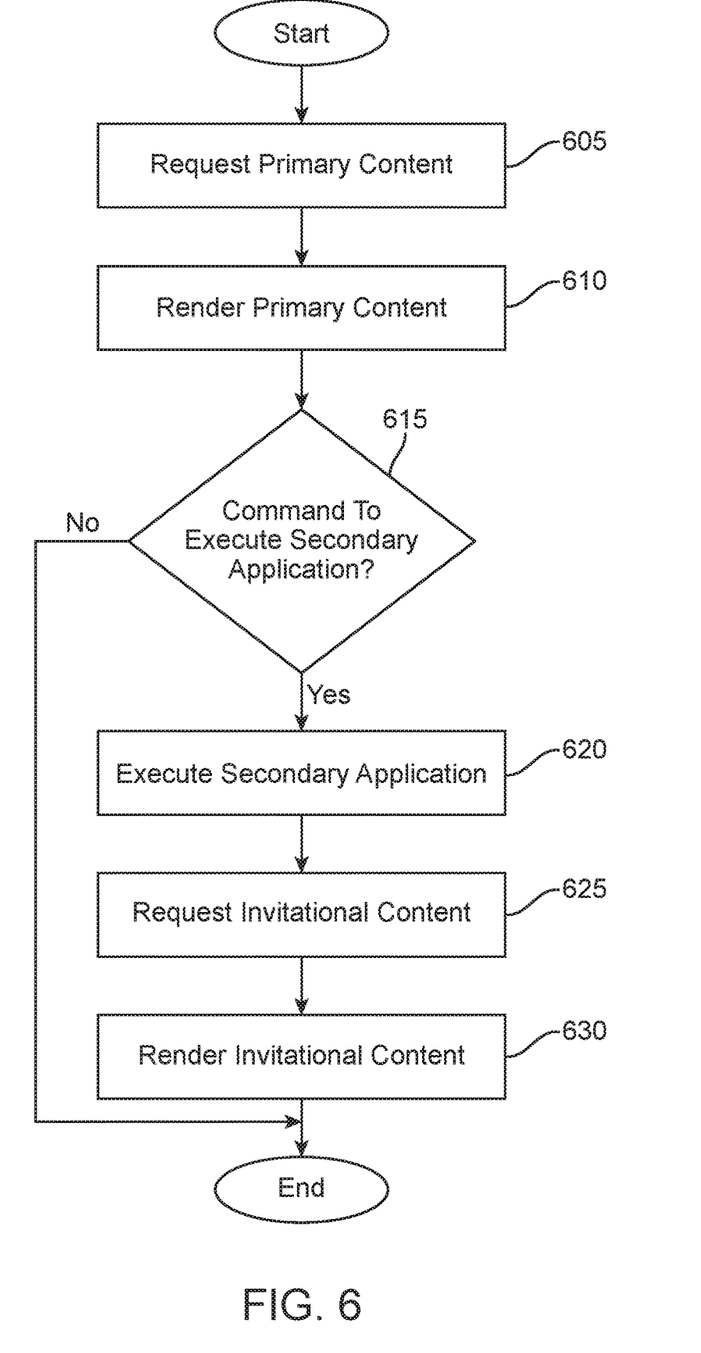
FIG. 6 illustrates an exemplary method embodiment of using a secondary application to render invitational content.

FIG. 6 illustrates an exemplary method embodiment of using a secondary application to render invitational content over primary content on a user terminal. As illustrated, the method begins with a user requesting primary content 605 to be displayed on the user terminal. A user can request primary content using a web browser application running on a user terminal. For example, the web browser application can be configured to receive a URL from the user and then request the primary content from the appropriate primary content provider associated with the entered URL. The web browser can be configured to request the primary content from the primary content provider through use of a communication network.

Upon receiving the request, the primary content provider can transmit the requested content back to the user terminal via the communication network. Once received by the user terminal, the primary content can be rendered 610 by the web browser to be displayed on the user terminal. For example, the primary content can be code, such as HTML or JavaScript, which can be processed by the web browser to render the requested content on the user terminal.

If the code being rendered by the web browser includes a command that a secondary application be executed 615, then the web browser sends a request to the operating system that the secondary application be executed 620. For example, the command can be in the form of an object tag requesting that an instance of a secondary application be created. In some embodiments the object tag can be associated with a special non-standard MIME type that instructs the web browser to look for a secondary application to manage display of a specified area. If at block 615, there is no command requesting that a secondary application be executed, the method ends.

Once executed, the secondary application can be configured to request invitational content 625 from an invitational content provider or content delivery system in network communication with the user terminal. In some embodiments, the request can include data which can be used by the invitational content provider or content delivery system in selecting invitational content to be returned to the user terminal.

For example, the secondary application also can have access to and be configured to harvest data to be used in determining which invitational content to render. This data can be collected from the web browser and the operating system.

In some embodiments, the secondary application can receive some data directly from the web browser. For example the object tag can include data specifying invitational content that can fit allocated spaces of specified dimensions. The data in the object tag can also specify that the invitational content meet other specifications, e.g., specifications such as content type (sports, retail, educational, etc.), target demographic information, etc.

Additionally, the secondary application can poll the operating system for additional data. The secondary application can be a known and trusted application to the operating system and thus given permission to harvest sensitive data from the operating system. Further, the secondary application can be executed in a secure sand boxed environment that limits access from third party applications. Accordingly, the secondary application can be trusted to securely gather sensitive information and protect the sensitive date from less secure third party applications. Since the secondary application is a secondary process that can communicate with the operating system, it has access to a variety of data that can be used to determine the optimum invitational content to display to a user. This data can include user preferences, such as configuration preferences; it can also include data identifying specific applications installed or running on the device, or more general information about the applications identifying applications by broad category; it can include information identifying the web browser requesting the targeted application; it can include past internet search terms, topics extracted from electronic communications; it can include network information such as network state, roaming information, type of connection such as 3-G, 2-G, Wi-Fi, connection speeds, etc., and carrier information; it can include general user information such as country of residence, home zip code, phone number area code, language preferences, keyboard configuration, and parental restrictions; it can include device information such as screen dimensions, screen resolution, hardware capabilities, a device ID, etc.; it can include data extracted from a social network profile, for example, what groups or applications the user is a member of, etc., or from an online store profile; and it can include other targeting data.

The secondary process can also have access to various hardware components of the device and can access targeting data such as GPS locations. While some examples of data are listed above, they should not be considered limiting, but rather exemplary for the purposes of providing a fuller explanation of the present technology.

User protection and privacy is a primary concern, and one of the many benefits of the present technology is the protection of the user's sensitive information while gaining the benefit of using the data to determine the optimum invitational content to display to a specific user. Because the secondary application is run separate from the web browser, the data can be gathered and kept separate from the web browser. Further, the secondary application can be configured to not share any identifying information. The user's identity is separate from the data used in selecting the invitational content and not shared, thus keeping the user associated with the data anonymous. In some embodiments, the private information never leaves the user terminal. For example, the content delivery system can deliver rules to the user terminal which are used along with the private information to select an appropriate item of invitational content. The content delivery system can then assemble the primary and invitational content based on the delivered rules.

As described above, one aspect of the present technology is the gathering and use of data available from various sources to improve the delivery of advertisements or any other content that may be of interest to users. The present disclosure contemplates that, in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for advertisement delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

After the secondary application sends a request for invitational content, the returned invitational content can then be rendered 630 over the primary content rendered by the web browser. The secondary application can run as a separate thread than the web browser while executing within the web browser, as a result the secondary application can be configured to render invitational content in a second window that is above the primary content. This can create the illusion that the primary and invitational content are being rendered within the same window while they are actually running in two separate windows.

One advantage of the present invention is that the primary and invitational content can run independently of each other and in separate windows and thus actions performed on one do not necessarily affect the other. For example, the invitational content can be configured to present the user with secondary views upon selection and the secondary views can be rendered in the second window without having an effect on the primary content rendered below.

In some embodiments, the secondary application can be configured to gather data that is used by the secondary application to render secondary views of the invitational content. For example, the secondary application can gather data to create a graphical transition between an initial and secondary view of the invitational content. An initial view of the invitational content can be a static image such as a banner advertisement, that when selected leads to a secondary view. The secondary application can be configured to gather data upon selection of the initial view that can be used as parameters to properly render a graphical transition between the two views. For example, in some embodiments the exact point of selection can be gathered by the secondary application and used to create a transition effect originating from that point. For example, the initial view can split open from the point of selection to reveal the second view that appears to be underneath.

In some embodiments, the data collected to render the secondary view can include a screenshot at the moment the invitational content is selected. The screenshot can be rendered in the second window above the primary content to create the illusion that a graphical transition is affecting the entire screen, while it is actually only taking place in the second window rendered above the primary content.

Figure 7A:
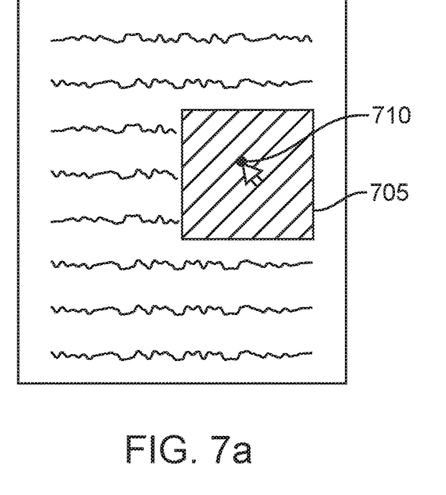
FIGS. 7a-7c illustrate progressive screenshots of an exemplary embodiment of invitational content that includes a graphical transition between an initial and secondary view or invitational content.
Figure 7B:
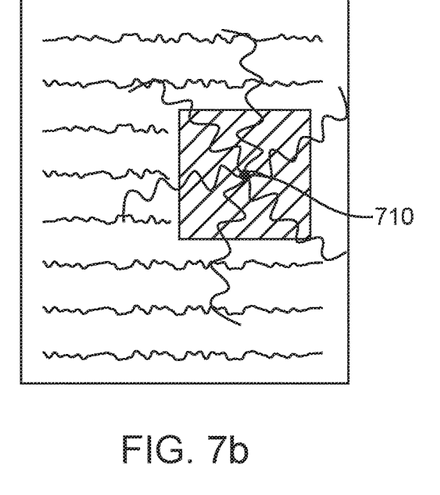
Figure 7C:
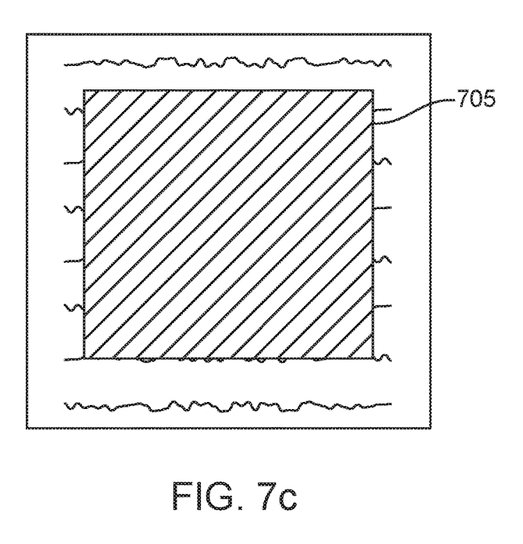

FIGS. 7*a*-7*c* illustrate progressive screenshots of an exemplary embodiment of invitational content that includes a graphical transition between an initial and secondary view. As illustrated in FIG. 7*a*, the initial view 705 can be a static image such as a banner advertisement. Upon selection, the secondary application can be configured to gather the exact point of selection 710 and a screenshot. FIG. 7*b* illustrates how both point of selection 710 and screenshot can be incorporated to create an effect across the whole screen. As illustrated, the secondary window displays the screenshot over the primary content to create the illusion that both the primary and invitational content are still both visible, although the entire screen is just a screenshot displayed in the secondary window. The point of selection 710 is used as an origination point for a visual effect making it appear that the screen is cracking to reveal an expanded view of the invitational content below. Finally, FIG. 7*c* illustrates the screen after the graphical transition is completed. The invitational content 705 has expanded to a second view, but the primary content below remains unaltered.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A mobile device comprising:
    a processor; and
    a memory storing instructions, which when executed by the processor causes the processor to:
        render primary content, the primary content having an allocated space on a first layer of a primary application, the allocated space having dimensions within the primary application;
        request, through an operating system of the mobile device, secondary content to be displayed, the request includes properties including dimensions and a location to fit the allocated space and a type of the secondary content;
        render the secondary content on a second layer, separate from the first layer of the primary application, wherein the second layer is positioned to obscure the allocated space, and wherein the second layer does not obscure the primary content rendered outside the allocated space within the first layer of the primary application;
        receive an interaction with the secondary content; and
        in response to receiving the interaction, expand the secondary content to obscure at least a portion of the primary content rendered outside the allocated space.

2. The mobile device of claim 1, wherein a secondary application renders the secondary content and is known and trusted by the operating system.

3. The mobile device of claim 1, wherein a secondary application is configured to communicate with the operating system of the mobile device to harvest sensitive data used to select the secondary content.

4. The mobile device of claim 3, wherein the secondary application being configured with a token to demonstrate that the secondary application is trusted by the operating system.

5. The mobile device of claim 1, wherein the secondary content is rendered in a dynamic view or a static view, the dynamic view configured to enable a user to scroll through multiple items and select an item of the multiple items to view and the static view configured to not vary over time or vary on user interaction.

6. The mobile device of claim 1, wherein the secondary content is active content or passive content, the active content configured to elicit a pre-defined response from the user and the passive content configured to provide information to the user or direct the user to active content.

7. The mobile device of claim 1, wherein the secondary content is also determined by a media format.

8. The mobile device of claim 7, wherein the media format is at least one of text, video, image, audio, and interactive content.

9. The mobile device of claim 1, comprising further instructions, which when executed by the processor causes the processor to:
    render a graphical transition, wherein the graphical transition is rendered after the interaction with the secondary content and before the secondary content is expanded to obscure at least a portion of the primary content rendered outside the allocated space.

10. The mobile device of claim 1, wherein the request includes an object tag identifying a secondary application to request and render the secondary content.

11. The mobile device of claim 1, wherein the request includes an object tag identifying a location to render the secondary content.

12. The mobile device of claim 11, wherein the object tag identifies a secondary application and causes the second layer to be positioned to obscure the allocated space.

13. The mobile device of claim 1, further comprising:
    in response to the request, cause, by the operating system, execution of a secondary application, wherein the request includes an object tag identifying the secondary application; and
    request, by the secondary application, the secondary content having the dimensions to fit the allocated space and the type of the secondary content.

14. A method, comprising:
rendering, by a processor of a mobile device, primary content, the primary content having an allocated space on a first layer of a primary application, the allocated space having dimensions within the primary application;
requesting, through an operating system of the mobile device, secondary content to be displayed, the request includes properties including dimensions and a location to fit the allocated space and a type of the secondary content;
rendering the secondary content on a second layer, separate from the first layer of the primary application, wherein the second layer is positioned to obscure the allocated space, and wherein the second layer does not obscure the primary content rendered outside the allocated space within the first layer of the primary application;
receiving an interaction with the secondary content; and
in response to receiving the interaction, expanding the secondary content to obscure at least a portion of the primary content rendered outside the allocated space.

15. The method of claim 14, wherein a secondary application renders the secondary content and is known and trusted by the operating system.

16. The method of claim 14, wherein a secondary application is configured to communicate with the operating system of the mobile device to harvest sensitive data used to select the secondary content.

17. The method of claim 14, wherein the secondary content is rendered in a dynamic view or a static view, the dynamic view configured to enable the user to scroll through multiple items and select an items of the multiple items to view and the static view configured to not vary over time or vary on user interaction.

18. The method of claim 14, wherein the secondary content is active content or passive content, the active content configured to elicit a pre-defined response from the user and the passive content configured to provide the user information or direct the user to active content.

19. The method of claim 14, wherein the secondary content is also determined by a media format.

20. The method of claim 19, wherein the media format is at least one of text, video, image, audio, and interactive content.

21. A non-transitory computer readable medium storing instructions, which when executed by a processor causes the processor to:
render primary content, the primary content having an allocated space on a first layer of a primary application, the allocated space having dimensions within the primary application;
request, through an operating system of a mobile device, secondary content to be displayed, the request includes properties including dimensions and a location to fit the allocated space and a type of the secondary content;
render the secondary content on a second layer, separate from the first layer of the primary application, wherein the second layer is positioned to obscure the allocated space, and wherein the second layer does not obscure the primary content rendered outside the allocated space within the first layer of the primary application;
receive an interaction with the secondary content; and
in response to receiving the interaction, expand the secondary content to obscure at least a portion of the primary content rendered outside the allocated space.

22. The non-transitory computer readable medium of claim 21, wherein a secondary application renders the secondary content and is known and trusted by the operating system.

23. The non-transitory computer readable medium of claim 21, wherein the secondary application is configured to communicate with the operating system of the mobile device to harvest sensitive data used to select the secondary content.

24. The non-transitory computer readable medium of claim 21, wherein the secondary content is rendered in a dynamic view or a static view, the dynamic view configured to enable the user to scroll through multiple items and select an items of the multiple items to view and the static view configured to not vary over time or vary on user interaction.

25. The non-transitory computer readable medium of claim 21, wherein the secondary content is active content or passive content, the active content configured to elicit a pre-defined response from the user and the passive content configured to provide the user information or direct the user to active content.

26. The non-transitory computer readable medium of claim 21, wherein the secondary content is also determined by a media format.

\* \* \* \* \*